United States Patent [19]
Sy et al.

[11] 3,874,871
[45] Apr. 1, 1975

[54] PRESERVING COMPOSITIONS FOR CUT FLOWERS

[75] Inventors: Max-Heinz Sy; Bernd-Dieter Holdt, both of Dusseldorf, Germany

[73] Assignee: Henkel & Cie GmbH, Dusseldorf-Halthausen, Germany

[22] Filed: Aug. 18, 1971

[21] Appl. No.: 172,866

[30] Foreign Application Priority Data
Aug. 27, 1970 Germany.......................... 2042400

[52] U.S. Cl. ................................................. 71/68
[51] Int. Cl................................................ A01n 3/02
[58] Field of Search.......................... 71/68; 424/343

[56] References Cited
UNITED STATES PATENTS
2,230,931  2/1941  Bussert ................................. 71/68
3,558,788  1/1971  Clark et al. .......................... 424/343
3,629,464  12/1971 Noslen et al. ........................ 424/343

Primary Examiner—James O. Thomas, Jr.
Attorney, Agent, or Firm—Hammond & Littell

[57] ABSTRACT

A preserving composition for cut flowers consisting essentially of from 30 to 45 parts by weight of monosaccharides, from 1 to 5 parts by weight of a water-soluble aluminum salt, from 0.01 to 0.5 parts by weight of boric acid, and from 0.5 to 2 parts by weight of a water-soluble germicide, aqueous solutions containing the same and the process of preserving cut flowers utilizing aqueous solutions of the preserving composition.

8 Claims, No Drawings

PRESERVING COMPOSITIONS FOR CUT FLOWERS

THE PRIOR ART

It is known to add compounds, such as common salt, acetylsalicylic acid, 1-phenyl-4-dimethylamino-2,3-dimethyl-pyrazolone-(5) or also amino acids, such as N-(2-hydroxyethyl)-beta-alanine to the water used for the preservation of cut flowers. Aluminum sulfate and disaccharides have also already been used. The effect of these additions is, however, not of long duration. There are also considerable differences depending upon the kind of flower utilized.

OBJECTS OF THE INVENTION

An object of the present invention is the development of preserving compositions for cut flowers that have good effectiveness and are useful in the preservation of as many flower species as is possible.

Another object of the invention is the development of a preserving composition for cut flowers consisting essentially of from 30 to 45 parts by weight of monosaccharides, from 1 to 5 parts by weight of a water-soluble aluminum salt, from 0.01 to 0.5 parts by weight of boric acid, and from 0.5 to 2 parts by weight of a water-soluble germicide.

A further object of the invention is the development of a method of preserving cut flowers utilizing an aqueous solution of the above composition.

These an other objects of the invention will become more apparent as the description thereof proceeds.

DESCRIPTION OF THE INVENTION

The above objects have been achieved and the drawbacks of the prior art overcome in the development of preserving agents that have a good effectiveness and make possible the preserving of as many flower species as possible. After extensive experiments it was ascertained that for this only very definite combinations are suitable. It has also been found that the preserving agent compositions have to have an acidic reaction.

The novel preserving agent compositions for cut flowers of the present invention are characterized in, that the compositions contain from 30 to 45 parts by weight of monosaccharides, from 1 to 5 parts by weight of aluminum salts, from 0.01 to 0.05 parts by weight of boric acid and from 0.5 to 2 parts by weight of germicidal additives.

As monosaccharides, mannose, galactose, gulose, and preferably, glucose, in the form of dextrose (d-glucose) are suitable. Suitable aluminum salts are particularly water soluble salts of acids such as aluminum formate, aluminum sulfate, and aluminum tartronate. It is, furthermore, essential that the preserving agents contain water-soluble germicidal additives. For this such compounds have been proven particularly good that can evolve formaldehyde, in aqueous solutions such as condensation products of formaldehyde and monoethanolamine. Further, N-methylol compounds of halogenated carboxylic acid amides with two to six carbon atoms, preferably chloroalkanoic acid amides, such as the N-methylol compounds of 2-chloroacetamide, 2,2-dichloroacetamide, 2,2,2,-trichloroacetamide, 2-chloropropionamide, 2,2,3-trichloropropionamide and 2-chlorobutyric acid amide are particularly effective.

The preserving agent compositions can be added to the flower water as solids, preferably in amounts of from 0.25% to 2%. It is, however, appropriate to prepare aqueous concentrates, in order to obtain a simple and uniform dosing. Preferably concentrates are prepared that contain per liter of water, from 300 to 450 gm of monosaccharides, from 10 to 50 gm of aluminum salts, from 0.1 to 0.5 gm of boric acid and from 5 to 20 gm of germicidal additives. These aqueous acidic concentrates are added in amounts of about 10 to 40 gm/liter to the flower water. The pH-value of the aqueous solutions lies generally in the range from 4 to 6. Preferably such solutions are used that contain, as monosaccharides, dextrose and, as germicidal additives, N-methylol compounds of halogenated carboxylic acid amides with two to six carbon atoms.

The novel compounds increase the durability of cut flowers considerably and have a broad spectrum of effectiveness in regard to the various, particularly commercially available flower species. They are, for example, suited for chrysanthemums, roses, carnations, irises, gerbera, calendula, gladioluses, lilies, and so on.

The following examples are illustrative of the invention without being deemed limitative in any respect.

EXAMPLE 1

An acidic, aqueous solution with the following ingredients was prepared:

| | |
|---|---|
| 40 | % of dextrose monohydrate |
| 2.5 | % of aluminum sulfate, cryst. |
| 0.03 | % of boric acid |
| 1 | % of a condensation product of formaldehyde with 2-chloroacetamide |

Instead of the named condensation product also the N-methylol compounds of 2,2-dichloroacetamide, 2,2,2,-trichloroacetamide, 2-chloropropionamide, 2,2,3-trichloropropionamide and 2-chlorobutyric acid amide can be used.

30 gm each of this acidic aqueous solution were added to 1 liter of tap water. For comparison flowers of the same degree of ripeness were put in these solutions and in tap water. As comparative figure 100 was defined as the durability of flowers in tap water. The following durabilities of the various kind of flowers were obtained using the above aqueous solutions:

| Forsythiae | 113 | Irises | 138 |
|---|---|---|---|
| Lathyrus | 121 | Calendulae | 139 |
| Convallariae | 125 | Rose "Bel Ange" | 142 |
| Lilies | 126 | Rose "Montezuma" | 153 |
| Gladioluses | 129 | Crys.indicum | 160 |
| Carnations | 134 | Gilly flowers | 162 |
| Gerber | 135 | Chrys.leucan-themum"Maximum" | 168 |

EXAMPLE 2

An acidic aqueous solution contained the following ingredients:

| | |
|---|---|
| 30 | % of dextrose |
| 5 | % of aluminum formate |
| 0.01 | % of boric acid |
| 2 | % of a condensation product of equimolecular quantities of formaldehyde and monoethanolamine |

10 gm each of this solution were added to one liter of tap water.

In a comparison experiment approximately the same times for the life time of the flowers were obtained as in Example 1.

The preceeding specific embodiments are illustrative of the practice of the invention. It is to be understood however, that other expedients known to those skilled in the art or disclosed herein may be employed without departing from the spirit of the invention or the scope of the appended claims.

We claim:

1. A preserving composition for cut flowers consisting essentially of from 30 to 45 parts by weight of monosaccharides, from 1 to 5 parts by weight of a water-soluble aluminum salt, from 0.01 to 0.5 parts by weight of boric acid, and from 0.5 to 2 parts by weight of a water-soluble germicide evolving formaldehyde in aqueous solution selected from the group consisting of condensation products of formaldehyde and monoethanolamine, and N-methylol compounds of chloroalkanoic acid amides having from two to six carbon atoms.

2. The composition of claim 1 wherein said monosaccharide is selected from the group consisting of mannose, galactose, gulose and glucose.

3. The composition of claim 2 wherein said monosaccharide is dextrose (d-glucose).

4. The composition of claim 1 wherein said water-soluble aluminum salt is selected from the group consisting of aluminum formate, aluminum sulfate and aluminum tartronate.

5. The process for preserving cut flowers which consists of adding from 0.25% to 2% of the composition of claim 1 to the flower water and inserting cut flowers therein.

6. An aqueous concentrate composition for preserving cut flowers consisting essentially of, per liter of water, from 300 to 450 gms of a monosaccharide, from 10 to 50 gms of a water-soluble aluminum salt, from 0.1 to 0.5 gms of boric acid, and from 5 to 20 gms of a water-soluble germicide evolving formaldehyde in aqueous solution selected from the group consisting of condensation products of formaldehyde and monoethanolamine, and N-methylol compounds of chloroalkanoic acid amides having from two to six carbon atoms.

7. The aqueous concentrate composition of claim 6 wherein said monosaccharide is dextrose and said water soluble germicide is an N-methylol compound of a chloroalkanoic acid amide having from two to six carbon atoms.

8. The method of preserving cut flowers which consists of adding from 10 to 40 gm of the aqueous concentrate composition of claim 6 to 1 liter of flower water and inserting cut flowers therein.

* * * * *